United States Patent [19]

Mehta

[11] 4,152,394

[45] May 1, 1979

[54] SYSTEM FOR IMPROVED ADDITIVE UTILIZATION IN AN AIR QUALITY CONTROL SYSTEM

[75] Inventor: Arun K. Mehta, Windsor, Conn.

[73] Assignee: Combustion Engineering, Inc., Windsor, Conn.

[21] Appl. No.: 847,340

[22] Filed: Oct. 31, 1977

[51] Int. Cl.² ............................ B01J 10/00; B01J 1/00; B01J 1/22; C01B 17/00
[52] U.S. Cl. .................................... 422/169; 422/234; 423/242
[58] Field of Search ................. 23/260, 283, 284, 285; 423/242

[56] References Cited

U.S. PATENT DOCUMENTS

| | | | |
|---|---|---|---|
| 2,142,406 | 1/1939 | Nonhebel et al. | 23/260 |
| 2,684,231 | 7/1954 | Pomykala | 23/284 X |
| 3,522,000 | 7/1970 | Kinney | 23/284 X |
| 3,706,538 | 12/1972 | Chew | 23/284 |
| 3,989,464 | 11/1976 | Dahlstrom et al. | 23/260 |
| 3,989,465 | 11/1976 | Onnen | 23/260 |
| 4,021,202 | 5/1977 | Field et al. | 23/260 |
| 4,047,891 | 9/1977 | Schuetz | 23/284 X |

*Primary Examiner*—Joseph Scovronek
*Attorney, Agent, or Firm*—Arthur L. Wade

[57] ABSTRACT

Water is sprayed through a gas stream before it flows to an Air Quality Control System scrubber tank to absorb $SO_2$ and produce a highly acidic liquid stream. The acid stream is mixed with a bleed stream from the AQCS cycle in a tank which will provide the residence time to complete the reaction of chemical in the bleed stream.

4 Claims, 1 Drawing Figure

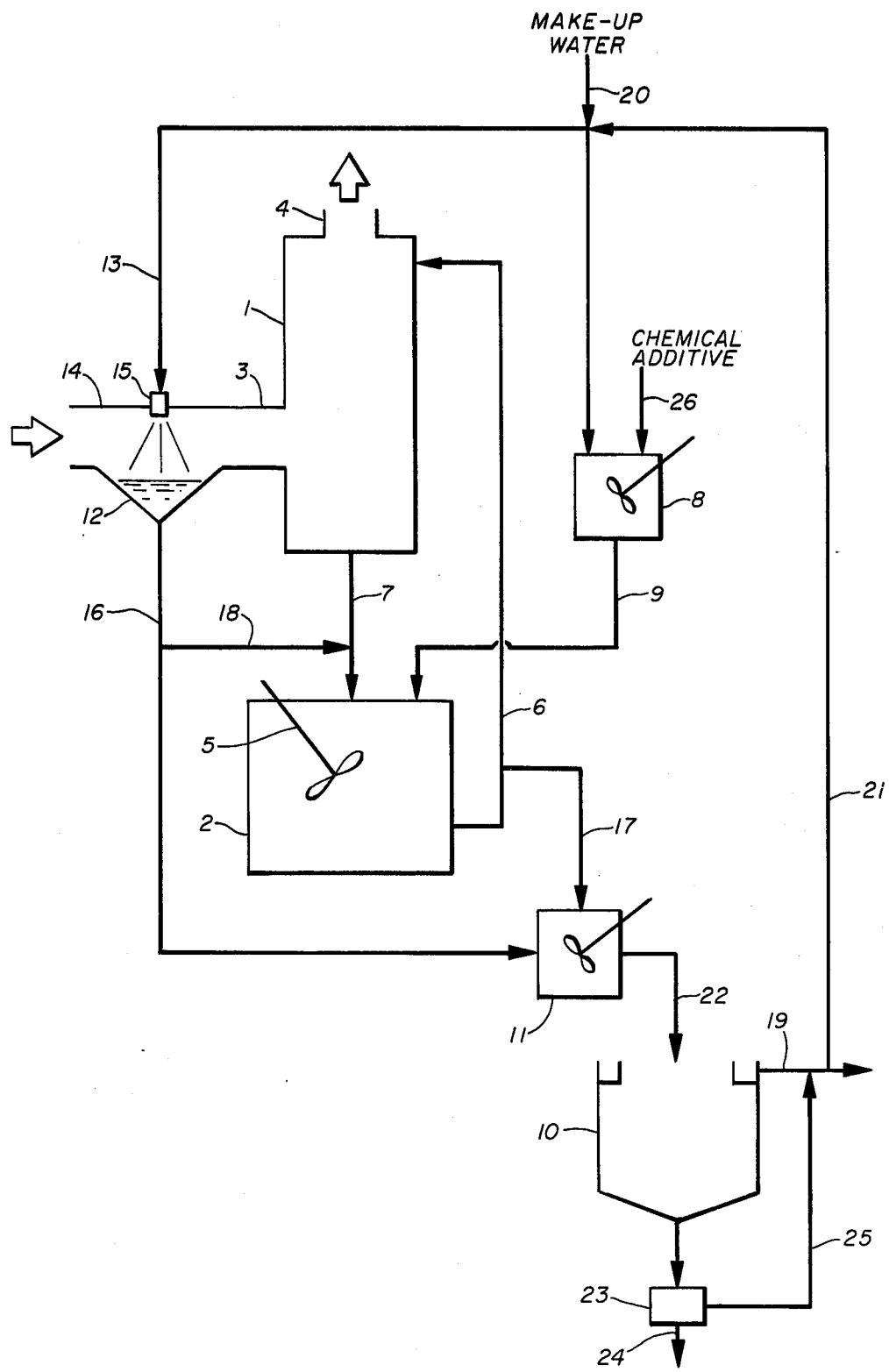

SYSTEM FOR IMPROVED ADDITIVE UTILIZATION IN AN AIR QUALITY CONTROL SYSTEM

BACKGROUND OF THE INVENTION

1. Field of the Invention

This invention relates to a system with which to substantially complete the reaction of chemical with the sulfur dioxide in a mixture of gases. More particularly, the invention relates to constructively increasing the residence time provided by the reaction tank of an Air Quality Control System (AQCS) to fully utilize the unreacted chemical bled from the system.

2. Description of the Prior Art

The AQCS has been developed to remove $SO_2$ from combustion gases by contacting the gas mixture with a slurry of water and lime/limestone. The cost of the additive lime/limestone has increased with the depreciation of fiat currency value. One way to counter the economic results of this deterioration is to discover and develop systems which are more efficient in utilizing the chemical to combine with $SO_2$.

Lime combines with $SO_2$ more efficiently than limestone. But with both additives, as chemicals, their dissolution rates are an important factor in their reactions with $SO_2$. It is the dissolution rates and the conditions existing in the reaction tank of the AQCS which must be improved.

Obviously, a simple increase in size of the reaction tank will gain residence time within which the desired chemical reaction will take place. However, a practical limit to the size of this tank is quickly reached in design. Additionally, the power requirement for mixing the chemicals and $SO_2$ in the tank quickly becomes excessive.

Examination of the AQCS cycle attracts attention to the feed stream of the gas mixture to the conventional scrubber tank. If the $SO_2$ upstream of the AQCS scrubber tank can be used to form a highly acidic liquid stream, that stream can be shifted to the exit of the system to react with the chemical not utilized. The chemical conventionally bled from the system can then be provided adequate residence time to fully react with $SO_2$ coming to the system.

SUMMARY OF THE INVENTION

The invention comtemplates establishing a water-gas mixture contact zone upstream of an AQCS scrubber tank in which $SO_2$ is absorbed by the water to form a highly acidic stream which is mixed with the chemical slurry bled from the stream which is cycled between the reaction tank of the system and the scrubber tank. The mixture is made in a tank which provides the residence time to substantially complete the reaction of the chemical with the highly acidic stream.

The invention further contemplates employing water discharged from the AQCS thickener and/or water from the make-up water supply available to the system to absorb $SO_2$ and form the highly acidic stream.

The invention further contemplates the tank being provided in which to mix the bled chemical with the highly acidic stream and provide the residence time to substantially complete the chemical-$SO_2$ reaction as the sole source of products discharged to the thickener of the AQCS.

Other objects, advantages and features of the invention will become apparent to one skilled in the art upon consideration of the written sepcification, appended claims, and accompanying drawings.

BRIEF DESCRIPTION OF THE DRAWINGS

The drawing is a diagrammatic elevation of that portion of an AQCS in which the invention is embodied.

BRIEF DESCRIPTION OF THE PREFERRED EMBODIMENT

The AQCS centers about the scrubber 1 and reaction tank 2. The gas mixture to be treated is conducted into scrubber tank 1 through conduit 3 and withdrawn through conduit 4. In the conventional AQCS, the sulfur dioxide in the gas mixture is removed in scrubber 1 by contact with a slurry of lime/limestone which is distributed through the gas mixture as it passes through the scrubber tank. The many variations of the structure that have been developed for scrubber tanks will not be reviewed, or any specific form disclosed. For the purposes of the present disclosure, the scrubber tank is a "black-box" through which the gas to be treated is flowed and in which the lime/limestone slurry, as the treating chemical, is distributed.

Reaction tank 2 is a container positioned below the scrubber tank to receive the chemical gravitated to it after its contact with the gas mixture. The function of tank 2 is to retain the gravitated chemical, and added fresh chemical, while contents of the tank are agitated with a mechanical structure 5.

Tank 2 is the immediate source of chemical for scrubber 1. Conduit 6 is connected between tank 2 and whatever distribution system for the chemical is mounted in scrubber 1. Of course, pumping requirements are provided in conduit 6, but it is not even necessary to symbolize a pump structure to disclose the present invention.

The chemical distributed in scrubber 1 absorbs $SO_2$ from the gas mixture. This chemical is then gravitated to lower tank 2 through conduit 7. The contents of tank 2 are then recycled to scrubber 1. This much of the AQCS has been well developed in the prior art.

A source of fresh chemical must be provided for the AQCS. A tank 8 is disclosed as a locus for preparation of this fresh chemical into a slurry. Conduit 9 provides the means with which this material is supplied to the reaction tank 2.

It has been past practice to continuously bleed unutilized chemical from the scrubber-reaction tank cycle. A reservoir or tank or container 10 represents the receiver for ultimate discharge from the scrubber tank-reaction tank cycle and where the chemical has been held until the water phase is recovered for reuse in the cycle. Again, this much of the AQCS is well developed in the prior art.

In one sense the present invention provides constructive enlargement of the capacity of reaction tank 2. The inherent characteristic of the scrubber-reaction tank cycle is to leave a significant amount of chemical unreacted. This is a polite way of stating that the conventional AQCS demands an excess of chemical be supplied to absorb the $SO_2$ of the gas mixture. A concept of the present invention is to develop a highly acidic liquid stream with $SO_2$ upstream of the AQCS scrubber and use this stream to complete utilization of the unreacted chemical conventionally discharged to the thickener. If this is done, an overall improvement in the efficiency of the AQCS will result.

Implementation of the inventive concepts begins with spraying water into intimate contact with the gas mixture containing $SO_2$ and flowing to the scrubber 1. The water absorbs the $SO_2$ and becomes highly acidic.

Next, a tank 11 is connected to receive the acidic stream and bled chemical from the cycle including the scrubber tank-reaction tank. The contents of tank 11 are stirred, agitated, mixed mechanically. When sized to give the proper residence time for the chemical and acid, the chemical reaction is completed and discharge is to thickener 10 for completion of the overall AQCS process.

In one sense, some load has been shifted from scrubber 1. However, the percentage of the load shifted could be quite small. The more important result of the invention is the full utilization of the chemical and, therefore, an increase in its efficient usage.

Auxiliary concepts of the invention are implemented by providing the highly acidic liquid stream with water sources available within the AQCS. The stream of water available is brought into thorough contact with the gas mixture before it reaches scrubber tank 1 through conduit 3. More specifically, a zone or chamber is embodied in a section of the conduits 3 and 14 upstream of conduit 3. This structure may take different forms, but the more simple would be a reservoir 12 which would contain the highly acidic liquid which is the product of spraying water from conduit 13 through the gas mixture flowing from conduit 14 to conduit 3.

The spray nozzles 15 could be given any of a number of forms. The reservoir could be varied in shape and location. In a broad sense, the teaching is simply that water, from whatever source, could be brought into intimate contact with the $SO_2$ of the gas mixture flowing into an AQCS. Depending upon many factors which are obvious to those skilled in the art, a quantity of $SO_2$ would be absorbed by the water to create a highly acidic liquid stream. The $SO_2$ load on the scrubber vessel will be reduced. The highly acidic stream will be directed by conduit 16 to utilization tank 11 for mixing with the material bled from conduit 6 through conduit 17.

There may be an excess quantity of the acidic liquid from reservoir 12. Design which includes specific load factors in the system will develop what quantitative excess there will be, if any. Conduit 18 is provided as a connection between conduits 16 and 7 for this excess. Controls for these flows are not disclosed as they are unnecessary to the teaching of the invention.

It is a concept of the invention that the source of water for conduit 13 is that discharged from thickener 10 through conduit 19 and/or make-up water in conduit 20 which is required for the slurry tank 8. Conduit 13 connects between conduit 20 and nozzles 15 to evidence this supply arrangement. Conduit 21 connects conduit 19 with conduit 13 to teach that the water discharged from thickener 10 could be an alternate, or supplementary, source of water for the nozzles 15.

A mechanical mixing device is symbolized in each of tanks 2, 8 and 11. With the residence time made available by the volumetric capacity of additive utilization tank 11, the acid stream in conduit 16, and the bled stream with unreacted chemical in conduit 17, are mixed and the reaction brought to substantial completion. The chemical supplied to the system is efficiently employed to remove $SO_2$, the final discharge of water and utilized chemical being directed via conduit 22 to thickener 10.

The thickened slurry is discharged from the bottom of thickener tank 10 to a rotary filter 23. The sludge stream is discharged from filter 23 through conduit 24. The water removed by the filter is conducted by conduit 25 to join the water in conduit 19.

No arrangement or operation of thickener 10 or filter 23 is disclosed as a part of the invention. This part of the AQCS is simply a possible source for the water required for slurry formation in tank 8 with chemical supplied through conduit 26. Additionally, as disclosed previously, this source of water can supply the water required to reduce the $SO_2$ load on scrubber vessel 1.

No attempt has been made to outline specific amounts of chemical, slurry, make-up water, $SO_2$, etc. There are some relative sizes to be emphasized. The quantitative size of the bled stream in conduit 17 and acid stream 16 fed to tank 11 are small compared with those of conduits 7 and 6. Of course the capacity of tank 11 is also quite small, compared to that of tank 2.

From the foregoing, it will be seen that this invention is one well adapted to attain all of the ends and objects hereinabove set forth together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

What is claimed is:

1. A system for removing $SO_2$ from a mixture of gases, including, a scrubber tank adapted to receive a gas mixture containing $SO_2$ and a supply of chemical which will react with the $SO_2$ and remove it from the mixture, a reaction tank connected in circuit with the scrubber tank to receive the chemical after contact with the $SO_2$ of the mixture, a source of water, means connected and arranged to the source of water to receive the gas mixture before the mixture is received by the scrubber tank and bring the water and $SO_2$ of the mixture into intimate contact for absorption of $SO_2$ by the water, and a tank connected to the circuit between the scrubber and reaction tank to receive a bleed containing unutilized chemical from the circuit and connected to receive the acidic liquid resulting from absorption of $SO_2$ by the water, whereby the unutilized chemical bled from the circuit is reacted with the acidic liquid so that substantially all the chemical supplied to the system is utilized in reaction with the $SO_2$.

2. In an air quality control system (AQCS) in which a scrubber tank receives gas mixtures containing $SO_2$ and in which chemical is brought into intimate contact with the mixture for reaction between the chemical and $SO_2$, in which a reaction tank is connected to the scrubber tank to receive the gas-contacted chemical from the scrubber tank and a fresh supply of chemical and deliver their mixture to the scrubber tank, a supply of fresh chemical is connected to the reaction tank to deliver fresh chemical to the reaction tank, the improvement including, a chamber defining a zone, and connected to the scrubber tank to receive all of the gas mixtures containing $SO_2$ before the mixtures are received by the scrubber tank, a supply of water connected to the chamber-zone in which the arrangement brings the water into intimate contact with the gas mixture to form a highly acidic liquid with the $SO_2$, a chemical utilization tank connected to the scrubber tank-reaction tank cycle to receive a bleed stream of the chemical circulated in the cycle and connected to the chamber-zone to receive a stream of the highly acidic liquid, wherein the chemical supplied to the AQCS is substantially all reacted with the $SO_2$ in the gas mixtures treated in the system and discharged therefrom, and, a thickener tank connected to the chemical utilization tank to receive the discharge therefrom and separate water from the chemical discharge, which water is then conducted to the fresh chemical supply and mixed therewith to supply the reaction tank with fresh chemical.

3. The system of claim 2 in which, the thickener tank is connected to the chamber-zone to supply water separated from the chemical to the chamber-zone as that water to contact the gas mixture and form the acidic liquid.

4. The system of claim 3 in which, a supply of make-up water is connected to the supply of fresh chemical for preparation of that chemical delivered to the reaction tank and is also connected to the supply of water from the thickener tank to provide an alternate and a supplementary source of water to the chamber-zone and fresh chemical.

* * * * *